United States Patent [19]

Stevenson

[11] Patent Number: 4,726,069

[45] Date of Patent: Feb. 16, 1988

[54] A MULTI-MODE MODULATION AND DEMODULATION SYSTEM AND METHOD

[76] Inventor: Carl R. Stevenson, 845 N. Woods Ave., Fullerton, Calif. 92632

[21] Appl. No.: 612,092

[22] Filed: May 18, 1984

[51] Int. Cl.$^4$ .............................................. H04B 7/00
[52] U.S. Cl. .......................................... 455/46; 455/47; 455/71; 455/202; 375/50; 375/61; 375/77; 375/97; 329/50
[58] Field of Search ...................... 332/44, 45; 375/43, 375/50, 97, 100, 102; 455/46, 47, 71, 202, 203, 305, 306, 312, 234, 235, 245, 296; 329/50

[56] References Cited

U.S. PATENT DOCUMENTS

| | | | |
|---|---|---|---|
| 3,271,681 | 9/1966 | McNair | 455/47 |
| 3,271,682 | 9/1966 | Bucher, Jr. | 455/47 |
| 3,611,144 | 10/1971 | Harmon, Jr. et al. | 455/46 |
| 3,792,364 | 2/1974 | Ananias | 455/202 |
| 4,313,211 | 1/1982 | Leland | 455/235 |
| 4,328,590 | 5/1982 | Lee | 455/203 |

Primary Examiner—Benedict V. Safourek
Attorney, Agent, or Firm—David O'Reilly

[57] ABSTRACT

An improved system and method for modulation, demodulation and signal processing for single sideband communications systems which provides correction for the adverse effects of rapid fading characteristics in a mobile environment. The system provides modulation through a modified Weaver modulator in which the audio input is processed to produce an output in the form of an upper sideband having a pilot tone in a spectral gap at approximately midband. The receiver includes a modified Weaver demodulator and a correction signal generating circuit which processes the received faded audio input and pilot tone to produce a correcting signal. The correcting signal is mixed with the received signal to regenerate unfaded versions of both the signal and pilot by removing random amplitude and phase modulations imposed on them by the fading.

21 Claims, 6 Drawing Figures

A MULTI-MODE MODULATION AND DEMODULATION SYSTEM AND METHOD

This invention was made with government support, under contract No. NAS 7-918, awarded by NASA. The government has certain rights in this invention.

FIELD OF THE INVENTION

This invention relates to single sideband communication systems and more particularly relates to methods of correcting for the adverse effects of propagation-induced fading in mobile communications systems.

BACKGROUND OF THE INVENTION

For many years the availability of frequencies for radio transmissions was not a problem. However, recently spectral resources have become more and more scarce due to a marked escalation in the public's need for additional channel capacity. The FM modulation techniques in use today require bandwidths which are too wide to permit the allocation of a sufficient number of additional channels in existing bands with present technology. Furthermore, due to a general shortage of suitable spectral resources, the assignment of additional spectrum to these uses appears quite unlikely, despite the significant, demonstrable need. These facts have dictated the need to make more efficient use of the spectrum already available for audio communications. Thus attention has turned to the use of single sideband (SSB) signals for transmissions which can dramatically reduce the spectral space required, particularly for land mobile communications. The use of amplitude-compandored signal sideband (ACSB) signals as an alternative to the more traditional "narrowband" FM thus has been proposed as a possible means of relieving the severe spectrum congestion which hampers effective land mobile communications throughout the world.

The following references describe the potential for single sideband communications (SSB) and propose systems for implementing it and are incorporated herein by reference:

REFERENCES (a) *Future Private Land Mobile Telecommunications Requirements*, Prepared by the Planning Staff of the Private Radio Bureau, Federal Communications Commission, Washington, D.C.

(b) Lusignan, B.B.: "Single-Sideband Transmissions for Land Mobile Radio", IEEE Spectrum, July 1978.

(c) McGeehan, J.P. et al.: "Theoretical and Experimental Investigation of Feedforward Signal Regeneration as a Means of Combating Multipath Propagation Effects in Pilot-Based SSB Mobile Radio Systems", IEEE Transactions on Vehicular Technology, Vol. VT-32, No. 1, February 1983.

(d) McGeehan, J. P. et al.: "Speech Communications Over a 942 MHz Tone-Above-Band Single Sideband Mobile Radio Channel (6.25 kHz) incorporating Feedforward Signal Regeneration:, (a paper presented to the IEEE Vehicular Technology Society Conference, 1983).

(e) McGeehan, J. P. et al.: "Pilot Tone Single Sideband for Mobile Satellite Communications", Proc. IEEE Third Intl. Conference on Satellite Systems for Mobile Communications and Navigation, London, June 1983

(f) Weaver, D. K., Jr.: "A Third Method of Generation and Detection of Single-Sideband Signals", Proc. IRE, Vol. 44, pp. 1703–1705, December 1956.

(g) Goatcher, J. K. et al.: "Noise Considerations in an Integrated Circuit VHF Radio Receiver", Proc. IERE Conference on Radio Receivers and Associated Systems", Leeds, England, July 1981, pp. 49–59.

(h) Darlington, Sidney: "On Digital Single-Sideband Modulators", IEEE Transactions on Circuit Theory, Vol. CT17, No. 3, August 1970.

To date, however, ACSB has not been developed to its fullest potential. The equipment currently undergoing developmental field trials in the U.S. is designed for operation exclusively in VHF "High Band" (approximately 150 MHz). At higher frequencies, such as the 800 MHz band, the performance of current technology is dubious, due to the rapid increase in the severity of adverse channel conditions resulting from multipath fading, as well as the combination of Doppler shift and the stringent tuning requirement for accurate demodulation of ACSB signals. Several different modulation formats have been investigated by others on an experimental basis in search of reasonable and effective solutions to these implementation problems, some of which are described in the above references, but all seem to have serious disadvantages in either a technical or an economic sense.

Since the primary impairments to effective mobile communications systems utilizing ACSB are the random amplitude and phase variations caused by the vehicle's motion through a quasi-stationary pattern of multipath signals, an efficient system which can detect and automatically correct for these unwanted variations is needed.

McGeehan et al., reference "e" listed above, describes experiments in which a pilot tone is inserted into a centrally-located notch in the audio baseband prior to modulation, and have reported very encouraging results. They also argued quite convincingly that such a modulation format carries with it a number of significant advantages over methods which place the pilot at the upper or lower edge of the channel. Their implementation of Feedforward Signal Regeneration (FFSR) circuitry as an "add-on convenience circuit" to a conventional SSB receiver does, however, impose some very difficult filtering requirements at baseband for properly separating the pilot from the voice spectrum for processing and requires the receiver to employ costly SSB crystal filters at IF to achieve the required adjacent channel selectivity.

For ACSB to gain unqualified, permanent regulatory and commercial acceptance on a large scale, a standard modulation format (with regard to pilot placement) and an effective means for correcting for the adverse effects of fading in the mobile environment is essential. Such a standard must provide acceptable performance not only in the VHF region, but also into the higher UHF frequency bands, such as the 800 MHz and 1500 MHz bands, since long-term growth in mobile communications will almost certainly result in increased use of these higher-frequency regions. Furthermore, the most acceptable standard from the stand-point of both regulatory and commercial acceptance would also be compatible and interoperable with existing FM technology and capable of reliable transmission of digital data in either SSB or FM modes without a requirement for expensive duplication of hardware (i.e. effectively requiring two different radios in one box). This would permit the technology to be gradually and economically "phased in" to bands which are presently occupied by FM systems, allowing practical implementation of spectrally-efficient technology with a minimal amount of cost and disruption to existing services. No system or modulation format proposed to date has addressed this requirement for multi-mode capability in a cost-effective and technically practical manner.

Research conducted during the development of the invention disclosed herein strongly support the conclusion that virtually all of the major disadvantages of previously investigated methods are rooted in utilization of traditional SSB modulation and demodulation techniques and the resulting treatment of the fading correction circuitry as merely "an add-on convenience circuit." This led to the conclusion that a departure from traditional SSB modulation and demodulation methods, coupled with a considerably more intimate association between the demodulation and fading correction processes, would solve the problems inherent in prior systems.

This conclusion resulted in the creation of a new and improved method of addressing the problems of ACSB in the higher-frequency bands.

It is therefore one object of the present invention to provide a single sideband communication system which effectively corrects for the adverse effects of fading at frequencies well into the UHF region.

Another object of the invention is to achieve acceptable performance, despite severe channel impairments inherent at higher frequencies in mobile communications environment.

Still another object is to provide a system which makes use of available and inexpensive integrated circuits to the maximum extent possible to permit integrated circuit implementation, thereby reducing both the size and cost of equipment.

A further object is to provide a SSB system having maximum possible degree of compatibility and circuit commonality with both current FM technology and efficient, narrowband digital modulation techniques.

BRIEF DESCRIPTION OF THE INVENTION

A single sideband communications system in which integral circuitry in the receiver demodulator permits correction for degradation due to adverse propagation effects during transmission. The method described may be implemented by analog circuits, as described herein for the sake of clarity, but is also particularly suitable for implementation by digital signal processing (DSP) methods, with the latter preferred for obvious reasons of efficiency, low cost, and reliability.

The SSB communications method and system of the invention employs SSB modulation and demodulation based on a modification of the Weaver modulator. This method of generating and detecting SSB signals was first described in an article in 1956 (f) but has not, to date, seen significant use in practical applications. At the time this method was first proposed, the state-of-the-art in component technology made is impractical for all but experimental circuits designed for operation over a very narrow range of frequencies, due to requirements for the generation of very accurate quadrature phase shifts at both RF and AF frequencies and close gain, phase, and delay matching between its two signal channels. Continued improvements in components and signal processing technology have removed many of these barriers, making it a more attractive and economical alternative to the more conventional method of employing narrow, steep-skirted IF (intermediate frequency) crystal filters for the rejection of the unwanted sideband and adjacent channel signals.

The transmitter employs a modified Weaver modulator to generate a single sideband signal having a central spectral gap or notch and an pilot carrier located in the gap. The initial transmitter stage is an audio processor which provides a band-limited, compressed, preemphasized signal, processed in a manner which will be readily apparent to those knowledgeable in this art. The audio input will have the spectral gap referred to hereinabove by processing in a manner similar to that described by McGeehan et al. in reference (e) above.

The receiver processes the received signal in a conventional manner up to the demodulator. The demodulator is a modified version of the Weaver demodulator which reverses the processing of the modulator and includes integral circuitry which corrects for fading by deriving a correction signal from the received pilot reference which is proportional to the fading imparted to the transmitted signals by the transmission path.

An accurate correction for random amplitude and phase modulations due to multipath fading is facilitated by incorporating an amplitude-normalized sine-cosine demodulator (ANSCD) into a Weaver demodulator in the receiver. (The outputs from the ANSCD are used to develop a correction signal as described in detail below.)

The above and other features of the invention will be more fully understood from the following detailed description and the accompanying drawing in which:

DETAILED DESCRIPTION OF THE INVENTION

TRANSMITTER DESCRIPTION (ACSB MODE)

Figure 1:
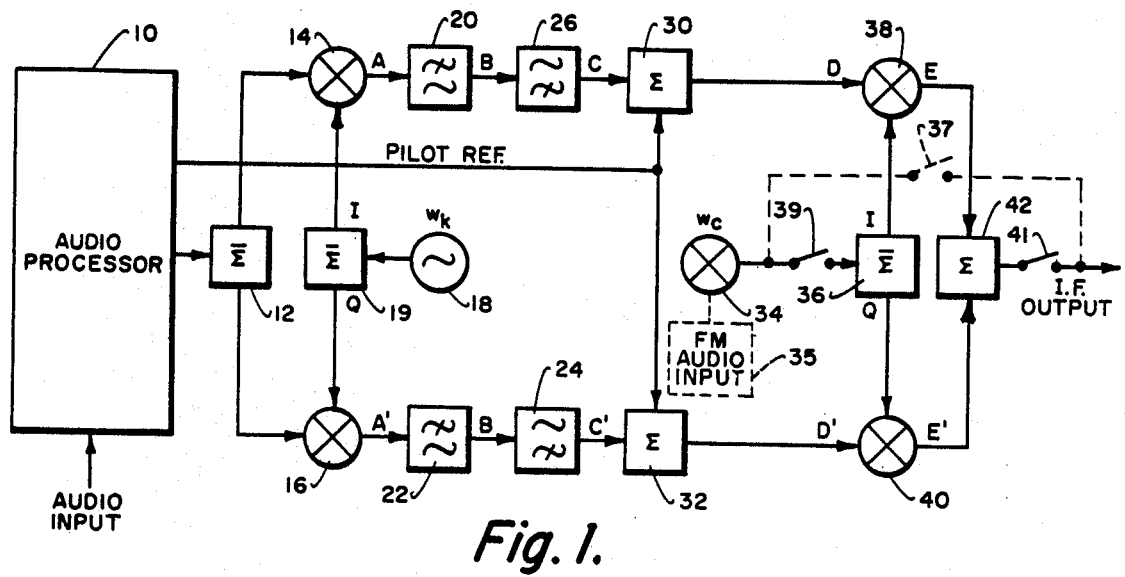
FIG. 1 is a schematic block diagram of an improved transmitter modulator according to the invention.
Figure 3:
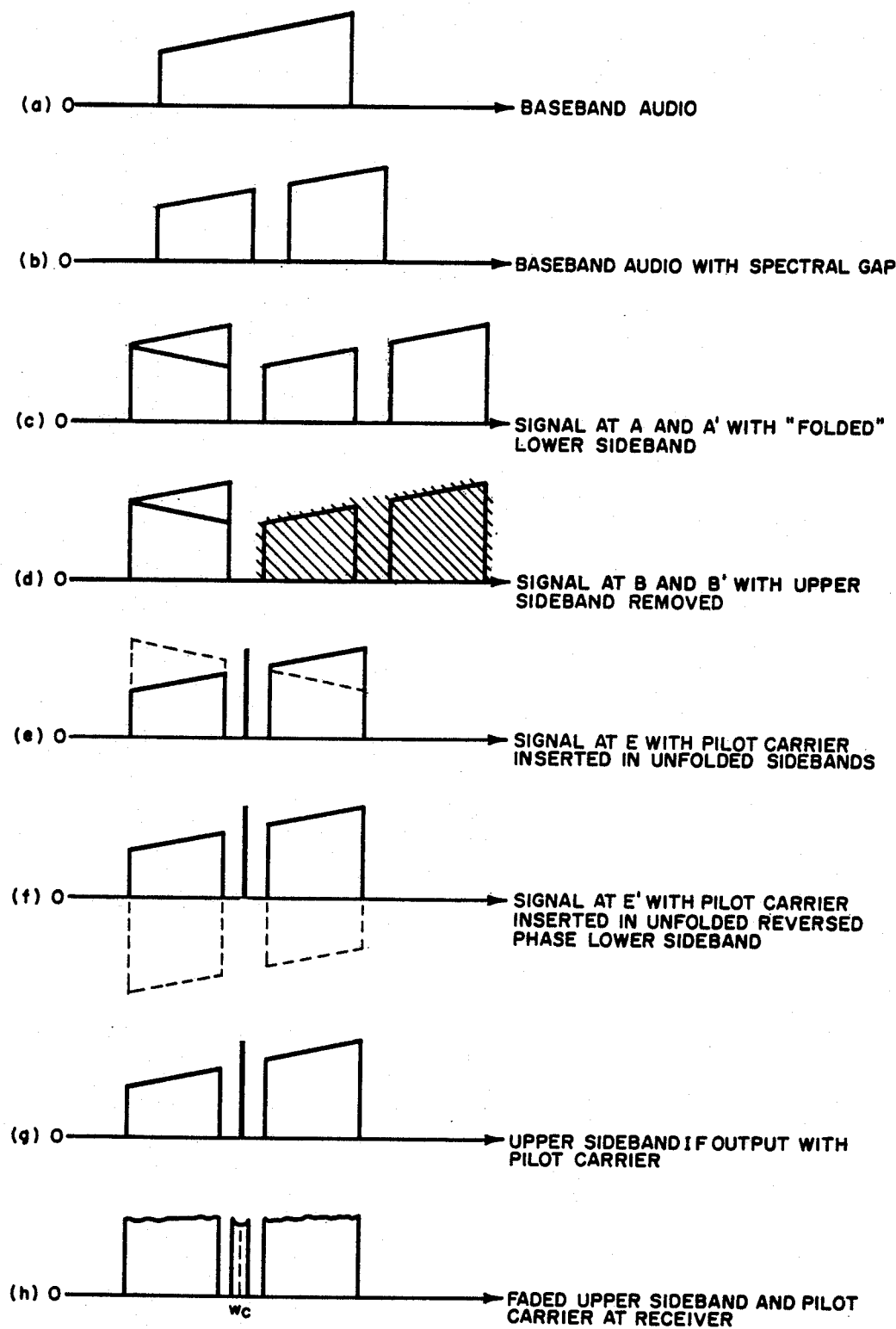
FIG. 3 is a graph illustrating the signal spectra at key points in the circuitry.

A transmitter shown generally in FIG. 1 is comprised of an audio signal processing circuit, a modulator, and IF output processing circuitry (not shown) which uses conventional signal processing circuitry known to those knowledgeable in the art. The IF (intermediate frequency) output from the transmitter modulator is an upper sideband having a spectral gap superimposed on a pilot carrier centrally located in the spectral gap. The audio input is generated by an audio processor 10 and fed to the modulating circuit which is a modified form of a Weaver modulator. The input to the modulator is band-limited, compressed, pre-emphasized and processed in a fashion similar to that described by McGeehan et al., (e) for a transparent tone-in-band (TTIB)

system to provide an audio baseband having a mid-band spectral gap of approximately twice the estimated Doppler frequency, plus some allowance for imperfect filtering as shown at (b) of FIG. 3.

The SSB is generated by a Weaver modulator, modifier to include highpass filtering (to "clean up" the folded spectral gap from DC to approximately Doppler frequency in the folded baseband signal) and carrier insertion.

In the modulator shown in schematic block diagram form in FIG. 1 (from left to right), the processed audio input signal is split into two in-phase components of equal magnitude by splitter 12 and applied to the first set of mixers 14, 16, where they are mixed with two quadrature-phase components of $w_k$, from oscillator 18 and quadrature splitter 19. $w_k$ is an audio frequency "sub-carrier" with a frequency equivalent to the center of the processed baseband signal.

The resulting outputs from the two mixers (at points "A" and "A'") contain both normal upper and "folded" lower sidebands as shown in FIG. 3(c). The upper sidebands are removed by subsequent lowpass filters 20, 22 in each channel as shown in FIG. 3(d).

The remaining lower sidebands (at points "B" and "B'") are "folded over" upon themselves, and extend from 0.5F (where $F_G$ is the width of the baseband spectral gap in Hz) to 0.5$F_H$ (where $F_H$ is the highest [processed] baseband input frequency in Hz).

Highpass filters 24,26 shown in FIG. 1 have a cutoff frequency equal to 0.5F, and are intended to further suppress any residual energy in the (now folded) spectral gap due to imperfect filtering in the baseband processing circuits, so that their outputs (points "C" and "C'") are relatively devoid of energy from 0 Hz to 0.5F.

Following the highpass filtering, a DC component (referred to in FIG. 1 as "Pilot Ref.") is added to both the in-phase and quadrature channels through summing circuits 30,32 to effect pilot carrier insertion in the subsequent mixing processes 38, 40. The level of the pilot carrier, $w_c$, from frequency source 34, in the outputs of the mixers can be varied by controlling the magnitude of the DC component (injected at points "D" and "D'"). In practice, this may be accomplished by means of a baseband-derived DC control voltage, assuring a constant pilot-to-signal ratio.

The outputs of final mixers 38, 40 (at points "E" and "E'") contain both the "unfolded" upper and lower sidebands, (shown at FIG. 3(e) and (f) respectively) symmetrically superimposed upon the (channel-center) pilot carrier, $w_c$. The phase relationships of the sidebands in the in-phase and quadrature channels are such that, when summed, the lower sidebands cancel, leaving the upper sideband symmetrically superimposed upon the pilot carrier with the pilot carrier, $w_c$, centered in the spectral gap.

It should be noted that imperfect suppression of the undesired lower sideband due to any imbalance in the circuitry will result only in some apparent increase in the level of distortion in the received audio and not "splatter" into the adjacent channel. This is due to the fact that both the desired and undesired sidebands occupy exactly the same band of frequencies, symmetrically superimposed upon channel center in a "mirror image" fashion as shown in FIGS. 3(e) and (f).

The subsequent frequency conversion and amplification of the resulting IF output signal is accomplished by conventional, well known means; and need not be further elaborated upon here.

Receiver Description (ACSB Mode)

The receiver shown in FIG. 2 includes a Weaver demodulation modified with a signal correction circuit 44 which will be described hereinafter and conventional audio output signal processing.

The received signal is amplified and converted to IF also through conventional means known to those knowledgeable in the art. There is no requirement for stringent IF filtering, such as the sharp, steep-skirted SSB filters found in conventional designs, but some reasonable degree of effort at band-limiting the IF is desirable.

The signal at the IF input (FIG. 2) consists of the faded, degraded pilot carrier and superimposed upper sideband, with the spectra of both the sideband and the pilot carrier "smeared" and broadened, due to the adverse effects of multiplath propagation as shown in FIG. 3(h). In previously proposed sideband receivers (where fading correction is treated as "an afterthought" or an "add-on convenience circuit"), the demodulation process places the faded, spread pilot spectrum in the center of the baseband, surrounded by sideband components. This imposes stringent filtering requirements and makes the subsequent pilot extraction and processing for fading correction very difficult at best. (That is for proposed SSB receivers with a "tone-in-band" or "transparent tone-in-band" pilot. For "tone-above-band" receivers now in limited commercial use for situation is even worse, because the placement of the pilot at the edge of the receiver's highly selective crystal filter results in significant de-correlation between pilot fades and signal fades, due to the group delay characteristics of such narrow, steep-skirted filters.)

These problems can be largely overcome through the use of a modified Weaver demodulator in the receiver having special, added circuitry which processes the pilot and corrects for the effects of fading, regenerating both pilot and sideband to their original, unfaded spectra during the final stages of demodulation. The special circuitry generates a correction signal which corrects for the degradation of the transmitted signal by adverse propagation effects due to the transmission path. The "marriage" of demodulation and fading correction processes into one simultaneous process (rather than treating them as separate processes as has been the practice) results in greatly simplified filtering requirements, multi-mode (SSB/FM/Digital) capability with a maximum amount of common circuitry and a minimal requirement for additional circuitry, and the ability to realize the majority of the needed circuitry in VLSI and/or DSP implementations for greater reliability, serviceability, and cost/size benefits.

Figure 2:
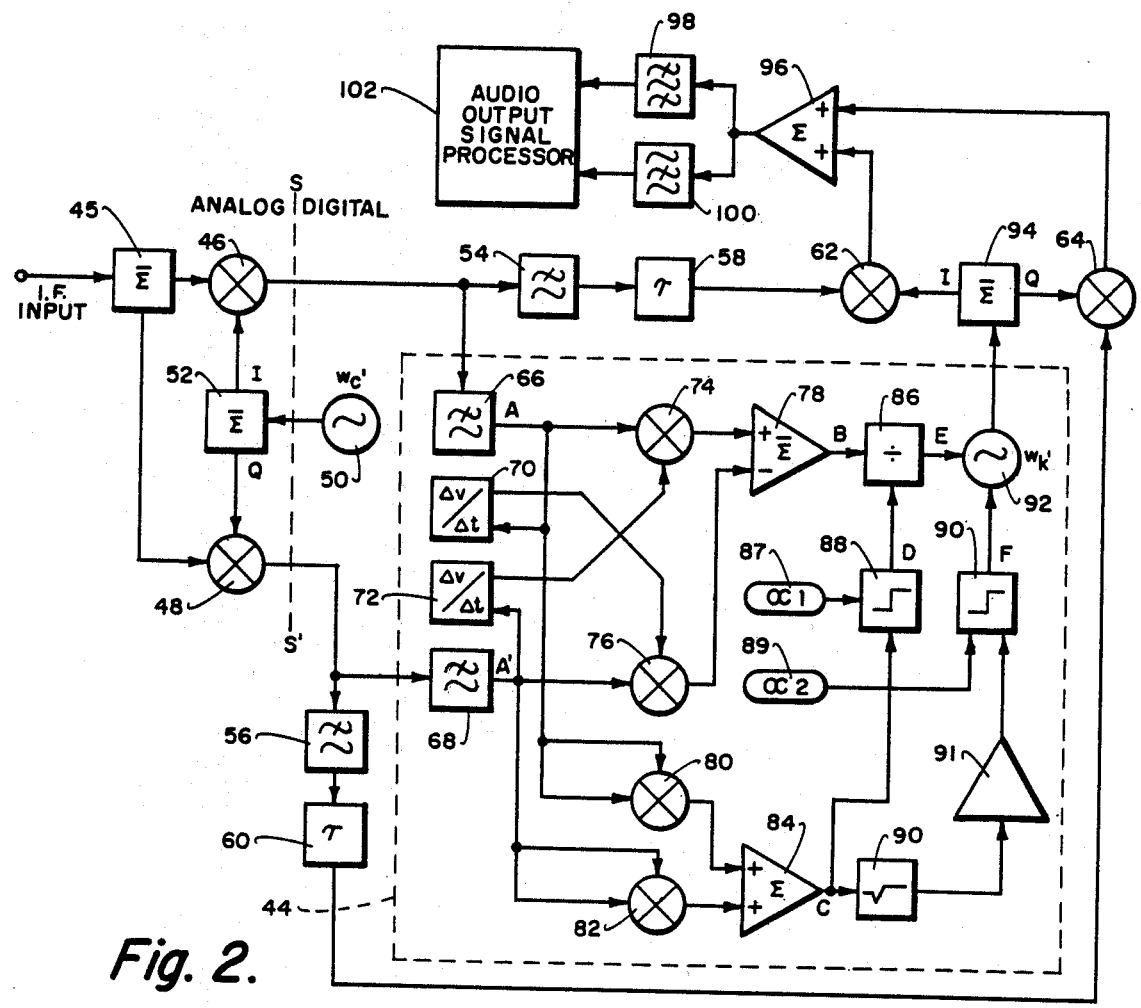
FIG. 2 is a simplified schematic block diagram of a receiver employing an improved demodulator with correction for signal degradation caused by transmission path impairments.

In FIG. 2, the basic Weaver demodulator is shown with special additional circuitry 44 for fading correction. The basic Weaver demodulator simply reverses the processes of the modulator, has been well described.

The received IF signal is split into identical samples by splitter 45. After mixing the identical samples of the faded IF signal with quadrature components of $w_c$, from oscillator 50 and splitter 52 in the first set of mixers 46,48, the pilot and the (folded) sidebands appear at the outputs of the mixers. The composite signal is band-limited of 0.5$F_H$ by low pass filters 54, 56 and delayed by delay circuits 58, 60 (by an amount equal to the delay through the pilot processor) prior to application to the second set of mixers 62,64.

The pilot spectrum in the folded baseband at the output of the first set of mixers is contained within a bandwidth equal to the Doppler frequency (twice Doppler prior to "folding" in the mixers), and is recovered at points "A" and "A'" in both channels by filtering in lowpass filters 66,68 with a corner frequency equal to 0.5F (approximately Doppler frequency). This separates the faded pilot from the sideband information, allowing the pilot to be processed by an amplitude-normalized sine-cosine detector to effect the detection of (and correction for) the adverse effects of fading. (The pilot selection filter inputs may alternatively be connected at the outputs of the main channel lowpass filters.)

The baseband pilot signals $P_I(t)$ and $P_Q(t)$ at "A" and "A'", respectively, in FIG. 2 are represented by:

$$P_I(t) = [R(t)/2]\sin \Phi(t) \quad (1)$$

and $$P_Q(t) = [R(t)/2]\cos \Phi(t) \quad (2)$$

where $R(t)$ is the amplitude of the pilot and $\Phi(t)$ is the angular phase/frequency error between $w_c$ and $w_{c'}$, then the signals at the outputs of the two differentiators 70,72 in FIG. 2 can be represented as:

$$dv/dt[P_I(t)] = [[R(t)/2]d\Phi(t)\cos \Phi(t)] + [[dR(t)/2]\sin \Phi(t)] \quad (3)$$

and $$dv/dt[P_Q(t)] = -[[R(t)/2]d\Phi(t)\sin \Phi(t)] + [[dR(t)/2]\cos \Phi(t)] \quad (4)$$

By cross-multiplying and subtracting these signals in mixers 74, 76 and amplifier 78 respectively, a demodulated output signal will be obtained at "B" which can be represented as:

$$f[d\Phi(t)] = [R^2(t)/4]d\Phi(t) \quad (5)$$

While this signal is proportional to $d\Phi(t)$, the rate of change of phase, it can readily be seen that it is also proportional to $R^2(t)/4$, one fourth of the square of the amplitude variation due to fading. In order to remove this amplitude term and derive pure phase information, the original baseband pilot signals of equations (1) and (2) are squared and summed by mixers 80, 82 and amplifier 84 respectively, producing a signal at "C" which is represented by:

$$f[R(t)] = R^2(t)/4 \quad (6)$$

Dividing equation (5) by equation (6) in divide circuit 86 produces an amplitude normalized signal, $d\Phi(t)$ at point "E", which is used to control the phase of the frequency source $w_{k'}$. Threshold circuits 87, 88 introduce a "threshold" as shown in FIG. 2, to prevent division by zero, yielding a minimum correction signal at "D" which is essentially equivalent to the value shown in equation (6).

The output "C" of the amplitude detector represented by equation (6), is further processed by square root circuit 90 to extract its square root yielding $[R(t)/2]$, which, after amplification by an appropriate factor in amplifier 91, is used to control the amplitude of $w_k$, of frequency source 92 so that it is inversely proportional to the faded pilot's amplitude. Another "threshold" is introduced by threshold circuits 89, 90 at this point, to limit the correction gain producing the actual correction signal at "F" controlling the output of frequency source 92 going to splitter 94.

The second mixing process in the Weaver demodulator at mixers 62, 64 is thus used to regenerate unfaded versions of both the audio signal and pilot signal by removing the random amplitude and phase modulations imposed upon them by the fading. This results in regeneration of the sideband and of the pilot as a single, unspread frequency component at a frequency of $w_k$, centered in the spectral gap in the unfolded, recovered sideband at the output of summing amplifier 96.

At this point, filters 98, 100 provide conventional bandpass and notch filtering functions which allow separation of the (now unspread, regenerated) voice and pilot components. The sideband can be processed in a conventional manner by audio output signal processor 102 to return all of its components to their original place in the baseband spectrum, closing the spectral gap and restoring the previously processed speech components to their proper, pretransmission frequencies; the companding and preemphasis processes can be reversed; followed by audio amplification and reproduction for the listener.

Once the pilot has been regenerated to a single spectral componet, it can be utilized effectively as a reference for both long-term AGC and AFC circuitry, if desired. (The effects of fast fading have been corrected for in the demodulation process.) The amplitude and phase-proportional signals already developed for fading correction may alternatively be integrated with a relatively long time constant and employed for the same purpose, with some possible savings in additional circuitry.

A significant advantage of the method and system described hereinabove is that it can be readily converted for dual use as an FM transceiver in addition to being particularly suitable for digital signal processing. Both the transmitter and receiver are easily converted to FM with a minimum of additional circuitry. The system and method described thus far is in terms of analog circuitry but is readily capable of being implemented, and preferably is, by digital circuits as will be described in greater detail hereinafter.

Transmitter Description (FM Mode)

FM transmission, using current land mobile radio, cellular mobile telephone, satellite FM-SCPC (signal channel per carrier), or similar technical standards may be accomplished with the system disclosed in a rather elegant yet simple manner, by disabling all of the ACSB transmitter circuitry except for the $w_c$ oscillator of FIG. 1. This oscillator produces a carrier frequency at channel center which can readily be frequency modulated by audio or data signals from FM audio input 35, upconverted to the desired output frequency and routed to the IF output through switch 37 with virtually no additional or redundant circuitry. The unused circuitry may quite easily be switched out of the signal path in hardware for an analog implementation by means of switches 39, 41.

Receiver Description (FM Mode)

Figure 4:
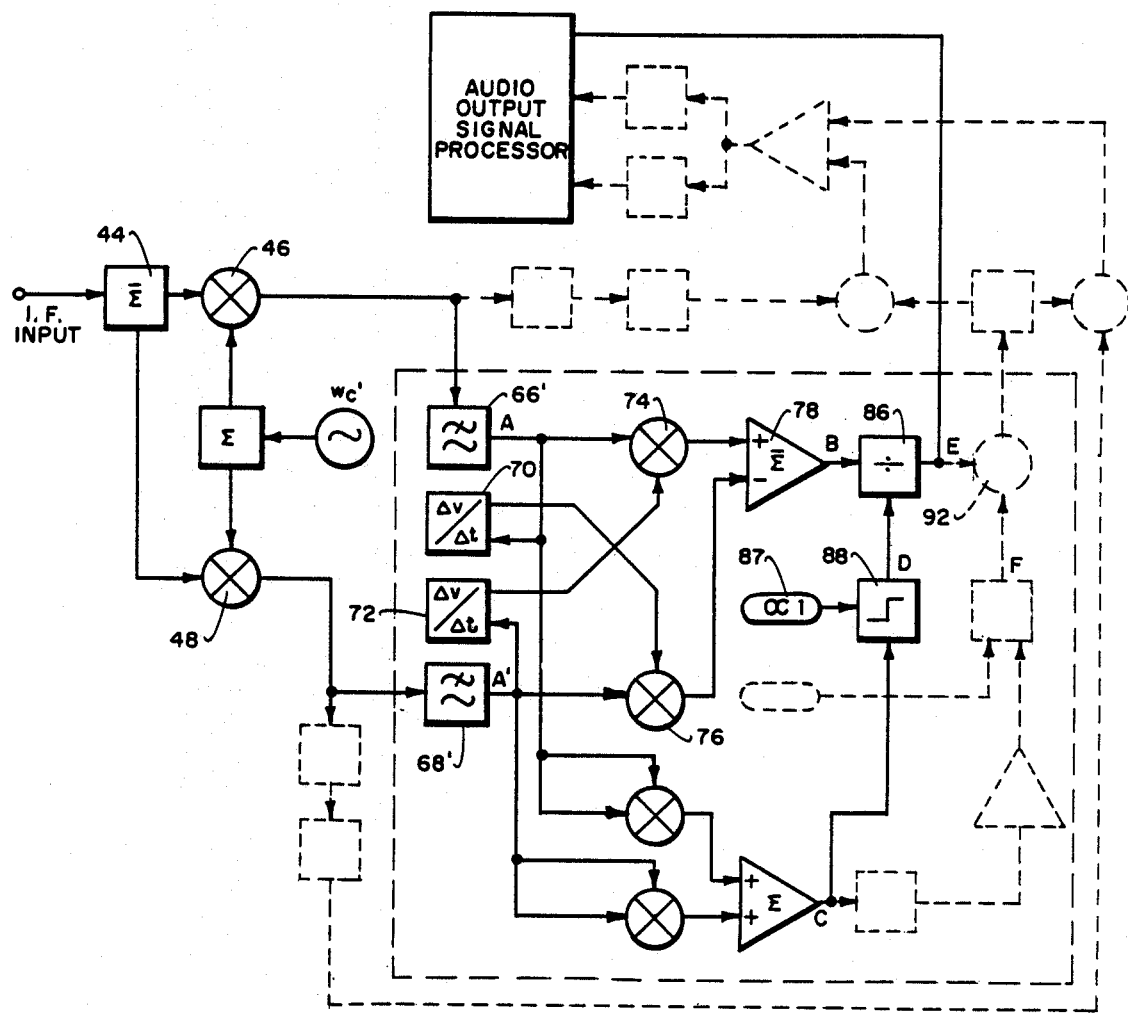
FIG. 4 is a simplified schematic block diagram illustrating circuit modifications for FM reception.

The reception of conventional FM transmissions, such as those used in land mobile radio, cellular mobile telephone, satellite FM-SCPC, and other services with similar technical standards is accomplished, as is FM transmission, with virtually no additional or redundant circuitry as shown in FIG. 4. Since the fading correction is accomplished, in part, with an amplitude-normalized sine-cosine demodulator (ANSCD), an effective FM detector is inherent in the design. All that is required is to disable (through hardware or software) the unneeded portions of the receiver shown dotted in FIG. 4; to widen the bandwidth of the lowpass filters 66', 68' at the input to the ANSCD to pass the wider (folder) FM baseband signal; and to take the audio output from the ANDSC at point E which normally outputs the ACSB phase-correction signal to the $w_k$, frequency source 92 in the case of ACSB reception.

Transmission and Reception of Digital Data

The transmission and reception of digital data may readily be accomplished in a number of ways, using either the SSB or FM modes as the basis for transmission. In the SSB mode, data may be input to the transmitter through the audio processor 10 in the form of a tone-coded signal and processed and transmitted in the same manner as speech. (Numerous well-known methods of tone-coding data for transmission over voice grade circuits exist, such as audio frequency shift keying (AFSK), audio phase shift keying (APSK), etc.) Some special advanced data coding of the data (such as Manchester coding, for example) may be desirable prior to the modulation process in the case of some data/tone formats, to minimize the baseband spectral power density in the vicinity of the baseband "spectral gap" which will eventually be occupied by the pilot, details of which are beyond the scope of this application.

Since the phase and amplitude perturbations due to fading are detected and corrected for in the SSB demodulation process, the adverse effects of the well-known phenomena of "irreducible error rate" (a limitation or "floor" on the best achievable transmission error rate for any given transmission bit rate, which is attributable to the random phase and amplitude perturbations due to fading) are greatly reduced. In addition, since the phase and amplitude of the signal have been corrected, coherent detection of data in a fading environment is feasible. These factors offer an advantage of at least several dB in the received (and, therefore, the transmitted) power required to achieve a given bit error rate (BER) for any given link and transmission rate, significantly improving the efficiency and reliability of data transmissions compared to the techniques which are presently employed.

In the FM mode, data may also be transmitted and received in the form of audio tones input through the FM audio input circuit 35. Alternatively, the digital data may be used to directly modulate the transmitter, again using well-known techniques such as minimum shift keying (MSK), gaussian-filtered minimum shift keying (GMSK), etc. The requirements for some auxiliary circuitry for coding and/or formatting the data as outlined above will apply equally to data transmission and reception in the FM mode and are again beyond the scope of this application. Data transmission may also be accomplished by well-known "quadrature modulation" methods, using somewhat more of the existing circuitry by applying inputs at D, D' in FIG. 1.

Digital Signal Processing (DSP) Implementations

Figure 5:
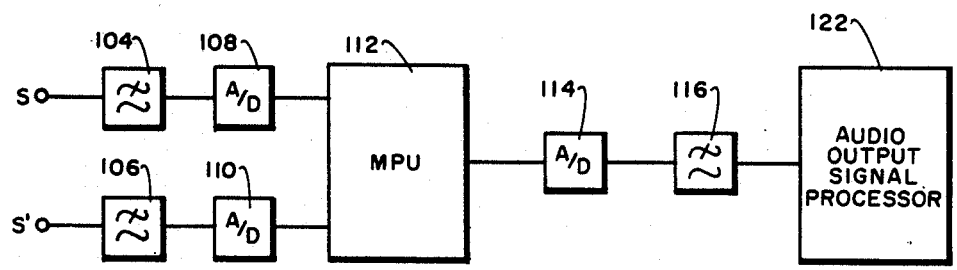
FIG. 5 is a simplified block diagram illustrating digital signal processing (DSP) of a received signal.
Figure 6:
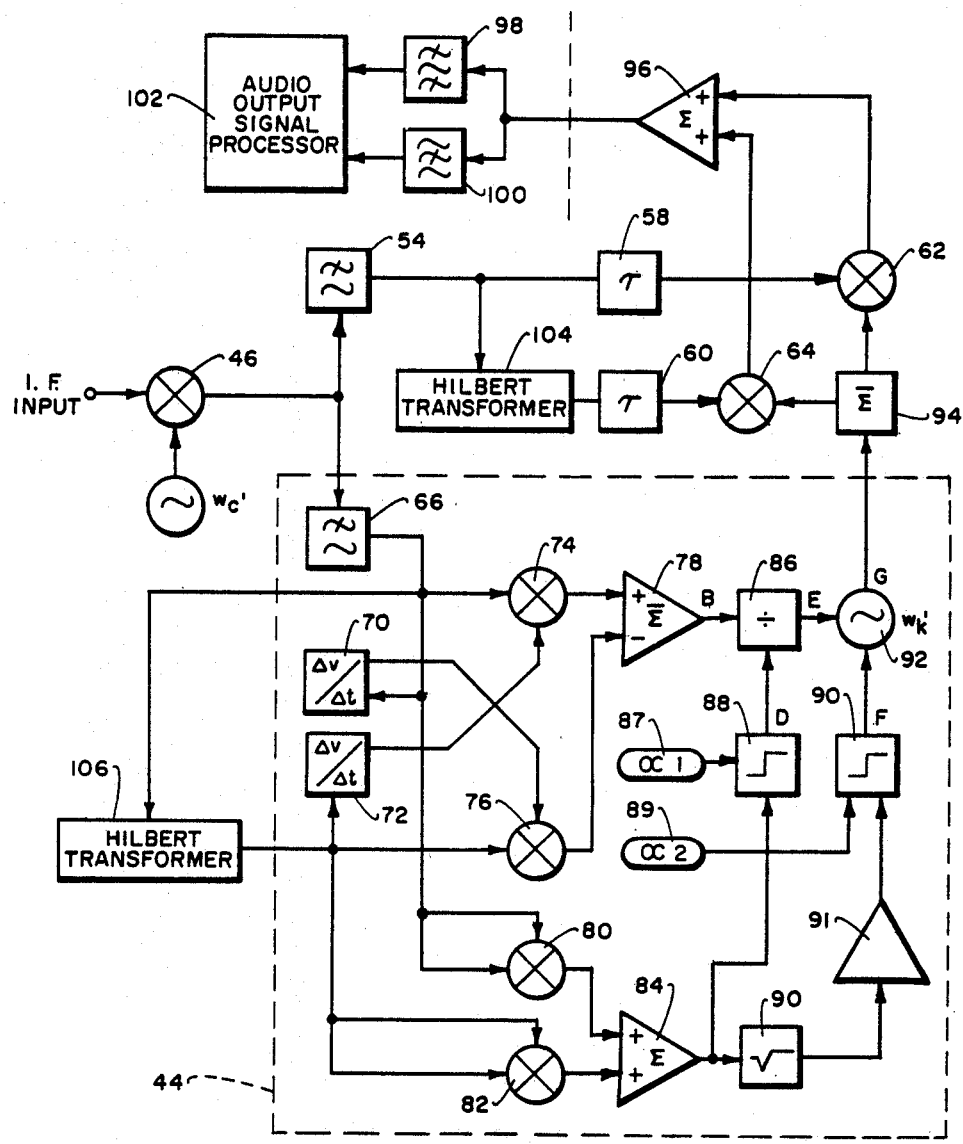
FIG. 6 is a simplified block diagram illustrating one alternative means of synthesizing the quadrature channel by means of Hilbert Transformers.

A simplified illustration of applicable digital signal processing techniques is shown in the block diagram of FIG. 5. For digital implementation the circuit would be preferably be broken at S,S' FIG. 1. The analog signals would be processed by anti-alias filters 104, 106, converted to digital by analog to digital convertors 108, 110 with correction processing being software implemented through microprocessor 112. The outputs are then converted back to digital by digital to analog convertors 114, 116, filtered at 118 and 120 and then delivered to audio output processor 122. In a DSP implementation, the quadrature channels may alternatively be synthesized by the use of Hilbert Transformers (filters which give a 90 degree phase shift across their passband) inserted in the receiver circuit after filters 54 and 66 respectively, eliminating the need for duplicative quadrature channel components 48, 52, 56, 68, and splitter 45, as shown in FIG. 6, or by the commutation process described by Darlington (h). These same techniques may be optionally utilized in the FM mode of reception and in the ACSB mode of transmission wherever quadrature signal paths are required. This is an option which may be decided on a case-by-case basis for each particular hardware design, depending upon which approach results in the most time and/or code efficient algorithm for the particular DSP processor in use. For example, the Texas Instruments TMS32010 DSP microprocessor seems to be quite well suited to this application. In any case, the derivative circuit topology; resulting (overall, effective) processing; and resulting spectra are effectively the same.

Thus a method and system has been described which allows the regeneration of SSB signals which have been subjected to the adverse effects of the multipath fading inherent in VHF and UHF mobile communications. It offers simplified filtering requirements and significantly improved performance over previously investigated techniques and lends itself well to implementation in a digital form, thereby showing a great potential for reducing the size and cost of spectrally efficient mobile radio units using SSB modulation.

It also, unlike any other SSB method proposed or in use, permits the construction of equipment with multi-mode capability (SSB/FM/Digital) with a previously unheard of simplicity, cost-effectiveness, and lack of wasteful duplication of circuitry.

This invention is not to be limited by the embodiment shown in the drawings and described in the description, which is given by way of example and not of limitation, but only in accordance with the scope of the appended claims.

What is claimed:
1. A single sideband communication system comprising;
transmitter processing means for generating and processing a single sideband IF signal;
said transmitter processing means including;
audio processing means for processing a baseband input;
said processing meand converting said baseband input to a single sideband IF signal consisting of information-carrying spectral components and a corresponding spectral gap;
signal processing meand deriving in-phase and quadrature-phase lower single-sideband IF signals each having a spectral gap, from said said single-sideband information carrying IF signal having a spectral gap;
signal insertion means for inserting a pilot signal into said spectral gap of each of said in-phase and quadrature-phase lower single-sideband IF signals;

signal combining means for combining said in-phase and quaduature-phase lower single sideband signals with said pilot signals in their respective spectral gaps to a composite sideband signal having said pilot signal for transmission;

receiver processing means for processing and composite sideband signal received with degradation caused during transmission;

said receiver processing means including;

signal processing for deriving in-phase and quadrature-phase signals from said received composite sideband signal;

correction signal generating means for generating a correction signal proportional to the degradation of said received composite sideband signals;

said correction signal generating means including means for separating said pilot signal from said composite sideband signal and generating a signal having phase information only by dividing a derived signal proportional to phase change and amplitude variation caused by signal dergradation by a derived signal proportional to amplitude variation caused by signal degradation;

means for modifying said received composite sideband signal with said correction signal for regenerating said information carrying spectral components of said single sideband IF signal and said pilot signal to correct for said degradation during transmission.

2. The system according to claim 1 in which said correction signal generating means includes:

means for separating the pilot signal from the information-carrying spectral components of said composite signal;

means for generating a signal proportional to the phase and amplitude variations imposed upon said received pilot signal in the course of said degradation.

3. The system according to claim 2 in which said means for generating said phase-proportional signal includes;

means for amplitude-normalizing said phase-proportional signal.

4. The system according to claim 2 in which pilot signal separating means comprises;

filtering means for filtering a received signal to separate said pilot signal from the remainder of the information-carrying spectral components of said composite signal.

5. The system according to claim 4 in which said filtering means has a bandwidth of approximately 0.5 of the maximum expected Doppler frequency.

6. The system according to claim 1 in which said means for deriving said signal proportional to amplitude variation comprises; means for squaring the pilot signal in said in-phase and quadrature phase channels; and means for summing said squared signals.

7. The system according to claim 6 including;

means for introducing a threshold signal in the path of said amplitude variation signal to preclude division by zero by said dividing means.

8. The system according to claim 7 including;

means for extracting the square root of said amplitude variation signal with said threshold signal to produce an amplitude correcting signal.

9. The system according to claim 8, including;

frequency source means, said frequency source means having in phase and amplitude correcting signal output controlled by said phase proportional first signal and said amplitude proportional second signal.

10. The system according to claim 9 including;

mixing means for mixing said phase and amplitude correcting signal from said controlled frequency source with said received signal in both channels for regeneration of a corrected audio and pilot signal.

11. The system according to claim 1 including converting means for converting said transmitter processing and said receiver processing means to means for transmitting and receiving FM signals.

12. The system according to claim 11 including Hilbert Transformer synthesizing said quadrature-phase channel.

13. The system according to claim 11 including means for transmitting and receiving digital data in an FM mode.

14. The system according to claim 11 including digital signal processing means for implementing said FM transmitting and receiving means through digital signal processing.

15. The system according to claim 1 including Hilbert Transformer synthesizing means for synthesizing said quadrature-phase channel.

16. The system according to claim 1 including means for transmitting and receiving digital data in an single sideband mode.

17. The system according to claim 1 including digital signal processing means for implementing said single sideband transmitting and receiving means through digital signal processing.

18. A method of demodulating a received faded composite signal comprised of a sideband signal having a pilot signal in a spectral gap to generate a signal to correct for signal degradations during transmission comprising;

converting said composite single sideband signal to in-phase and quadrature-phase sideband signals;

separating faded pilot signals from each of said in-phase and quadrature-phase sideband signals;

processing said separated faded pilot signals to generate a correcting signal proportional to the degradation of the received signal due to adverse propogation effects during transmission;

modifying said in-phase and quadrature-phase signals with said correction signal to remove said degradations from said received composite single sideband signal;

whereby unfaded versions of said single sideband signal and pilot signal are regenerated by removing random amplitude and phase modulations.

19. A method according to claim 18 in which said correction signal is generated by;

filtering said in-phase and quadrature-phase signals to extract said faded pilot signals;

said step of processing said separated pilot signals comprising processing said pilot signals to derive a phase and amplitude correcting signal.

20. The method according to claim 19 in which said phase and amplitude correcting signal is generated by;

deriving a first signal proportional to phase change and amplitude variation due to said signal degradation;

deriving a second signal proportional to amplitude variation caused due to said degradation;

dividing said first signal proportional to phase change and amplitude variation by said second signal proportional to amplitude variation to produce a signal having phase information only;

extracting the square root of said signal proportional to amplitude variation only;

controlling a frequency source with said signal proportional to phase change only to control the phase of said frequency source;

controlling said frequency source with said signal derived by taking the square root of the originally derived amplitude proportional signal to control the amplitude of said frequency source;

whereby the output of said frequency source is said correction signal.

21. The method according to claim 18 in which;

said in-phase and quadrature-phase signals are converted to a spectrally folded lower sideband signal and an upper sideband signal;

filtering said in-phase and quadrature-phase signals to remove said upper sideband signals;

mixing the in-phase and quadrature-phase spectrally folded lower sideband signals with said correction signal to remove said degradation from said in-phase and quadrature-phase signals; and summing said in-phase and quadrature-phase signals with said degradations removed.

* * * * *